(12) United States Patent
Mitchem

(10) Patent No.: US 7,054,312 B2
(45) Date of Patent: May 30, 2006

(54) MULTI-RATE SHARED MEMORY ARCHITECTURE FOR FRAME STORAGE AND SWITCHING

(75) Inventor: William J. Mitchem, Lafayette, CO (US)

(73) Assignee: McDATA Corporation, Broomfield, CO (US)

(*) Notice: Subject to any disclaimer, the term of this patent is extended or adjusted under 35 U.S.C. 154(b) by 958 days.

(21) Appl. No.: 09/932,223

(22) Filed: Aug. 17, 2001

(65) Prior Publication Data

US 2003/0046496 A1    Mar. 6, 2003

(51) Int. Cl.
*H04L 12/50* (2006.01)
(52) U.S. Cl. ....................... 370/379; 370/392
(58) Field of Classification Search ................ 370/429, 370/229, 412, 351, 372, 375, 378, 379; 710/305
See application file for complete search history.

(56) References Cited

U.S. PATENT DOCUMENTS

| | | | |
|---|---|---|---|
| 4,700,391 A | 10/1987 | Leslie, Jr. et al. | |
| 5,513,139 A | 4/1996 | Butler et al. | |
| 5,535,197 A * | 7/1996 | Cotton | 370/395.72 |
| 6,031,842 A | 2/2000 | Trevitt et al. | 370/412 |
| 6,061,358 A | 5/2000 | Nelson et al. | 370/412 |
| 6,065,087 A | 5/2000 | Keaveny et al. | 710/129 |
| 6,118,835 A | 9/2000 | Barakat et al. | |
| 6,138,185 A | 10/2000 | Nelson et al. | 710/33 |
| 6,160,813 A * | 12/2000 | Banks et al. | 370/422 |
| 6,240,096 B1 * | 5/2001 | Book | 370/412 |
| 6,763,029 B1 * | 7/2004 | Trevitt et al. | 370/412 |
| 2002/0167958 A1 * | 11/2002 | Martin et al. | 370/429 |
| 2005/0047334 A1 * | 3/2005 | Paul et al. | 370/229 |

* cited by examiner

*Primary Examiner*—Chau Nguyen
*Assistant Examiner*—Jung Park
(74) *Attorney, Agent, or Firm*—Hensley Kim & Edgington, LLC

(57) ABSTRACT

Shared memory provides buffering and switching for all frames that flow through a fiber channel switch. Received frames are written to shared memory by the receiving port then read from shared memory by the transmitting port. Shared memory provides for data to be written to a buffer at one rate, and read from a buffer at a different rate, or vice versa.

18 Claims, 14 Drawing Sheets

| Time Module 34 | Column |
|---|---|

| | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0 | W0 | W1 | W2 | W3 | W4 | W5 | W6 | W7 | W8 | W9 | W10 | W11 | W12 | W13 | W14 | W15 | W16 |
| 1 | R0 | R1 | R2 | R3 | R4 | R5 | R6 | R7 | R8 | R9 | R10 | R11 | R12 | R13 | R14 | R15 | R16 |
| 2 | W16 | W0 | W1 | W2 | W3 | W4 | W5 | W6 | W7 | W8 | W9 | W10 | W11 | W12 | W13 | W14 | W15 |
| 3 | R16 | R0 | R1 | R2 | R3 | R4 | R5 | R6 | R7 | R8 | R9 | R10 | R11 | R12 | R13 | R14 | R15 |
| 4 | W15 | W16 | W0 | W1 | W2 | W3 | W4 | W5 | W6 | W7 | W8 | W9 | W10 | W11 | W12 | W13 | W14 |
| 5 | R15 | R16 | R0 | R1 | R2 | R3 | R4 | R5 | R6 | R7 | R8 | R9 | R10 | R11 | R12 | R13 | R14 |
| ... | | | | | | | | ... | | | | | | | | | |
| 30 | W2 | W3 | W4 | W5 | W6 | W7 | W8 | W9 | W10 | W11 | W12 | W13 | W14 | W15 | W16 | W0 | W1 |
| 31 | R2 | R3 | R4 | R5 | R6 | R7 | R8 | R9 | R10 | R11 | R12 | R13 | R14 | R15 | R16 | R0 | R1 |
| 32 | W1 | W2 | W3 | W4 | W5 | W6 | W7 | W8 | W9 | W10 | W11 | W12 | W13 | W14 | W15 | W16 | W0 |
| 33 | R1 | R2 | R3 | R4 | R5 | R6 | R7 | R8 | R9 | R10 | R11 | R12 | R13 | R14 | R15 | R16 | R0 |

FIGURE 5B

2GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 0T | 0 | | | | | | | | SOF | A | B | C | D | E | F | G | H | I |
| 20T | 0 | J | K | L | M | N | O | P | | | | | | | | | | |
| 34T | 1 | | | | | | | | | R | S | T | U | V | W | X | Y | Z |
| 54T | 1 | CRC | EOF | | | | | Q | | | | | | | | | | |

2GBps Read after 2GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 1T | 0 | | | | | | | | SOF | A | B | C | D | E | F | G | H | I |
| 21T | 0 | J | K | L | M | N | O | P | | | | | | | | | | |
| 35T | 1 | | | | | | | | | R | S | T | U | V | W | X | Y | Z |
| 55T | 1 | CRC | EOF | | | | | Q | | | | | | | | | | |

| FIFO_0 | FIFO_1 |
|---|---|
| SOF | A |
| B | C |
| D | E |
| F | G |
| H | I |
| J | K |
| L | M |
| N | O |
| P | Q |
| R | S |
| T | U |
| V | W |
| X | Y |
| Z | CRC |
| EOF | |

FIGURE 6

2GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 0T | 0 | | | | | | | | SOF | A | B | C | D | E | F | G | H | I |
| 20T | 0 | J | K | L | M | N | O | P | | | | | | | | | | |
| 34T | 1 | | | | | | | | | R | S | T | U | V | W | X | Y | Z |
| 54T | 1 | CRC | EOF | | | | | | Q | | | | | | | | | |

1GBps Read after 2GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 1T | 0 | | | | | | | | SOF | A | B | C | D | E | F | G | H | I |
| 21T | 0 | J | K | L | M | N | O | P | | | | | | | | | | |
| 35T | 1 | | | | | | | | | R | S | T | U | V | W | X | Y | Z |
| 55T | | | | | | | | | | | | | | | | | | |
| 69T | 1 | | | | | | | | Q | | | | | | | | | |
| 89T | 1 | CRC | EOF | | | | | | | | | | | | | | | |

| FIFO_0 | FIFO_1 |
|---|---|
| SOF | A |
| B | C |
| D | E |
| F | G |
| H | I |
| J | K |
| L | M |
| N | O |
| P | Q |
| R | S |
| T | U |
| V | W |
| X | Y |
| Z | CRC |
| EOF | |

FIGURE 7

1GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 0T | 0 | E | — | F | — | G | — | H | SOF | — | A | — | B | — | C | — | D | — |
| 20T | 0 | — | N | — | O | — | P | — | — | — | — | J | — | K | — | L | — | M |
| 54T | 0 | — | — | — | — | — | — | — | — | — | R | — | S | — | T | — | U | — |
| 68T | 1 | V | — | W | — | X | — | Y | Q | Z | CRC | EOF | | | | | | |
| 88T | 1 | | | | | | | | | | | | | | | | | |

2GBps Read after 1GBps Write

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 1T | 0 | E | N | F | O | G | P | H | SOF | — | A | J | B | K | C | L | D | M |
| 21T | 0 | | | | | | | | | | | | | | | | | |
| 35T | 1 | V | — | W | — | X | — | Y | Q | Z | R | CRC | S | EOF | T | — | U | — |
| 55T | 1 | | | | | | | | | | | | | | | | | |

| FIFO_0 | FIFO_1 |
|---|---|
| SOF | — |
| A | J |
| B | K |
| C | L |
| D | M |
| E | N |
| F | O |
| G | P |
| H | Q |
| Z | R |
| CRC | S |
| EOF | T |
| | U |
| | V |
| | W |
| | X |
| | Y |

FIGURE 8

1GBps Write       Column

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 0T | 0 | | | | | | | | SOF | — | A | — | B | — | C | — | D | — |
| 20T | 0 | E | — | F | — | G | — | H | — | I | — | J | — | K | — | L | — | M |
| 54T | 0 | — | N | — | O | — | P | — | | | | | | | | | | |
| 68T | 1 | | | | | | | | Q | — | R | — | S | — | T | — | U | — |
| 88T | 1 | V | — | W | — | X | — | Y | — | Z | CRC | EOF | | | | | | |

1GBps Read after 1GBps Write       Column

| Time | Row | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| 1T | 0 | | | | | | | | SOF | — | A | — | B | — | C | — | D | — |
| 21T | 0 | E | — | F | — | G | — | H | — | I | — | J | — | K | — | L | — | M |
| 35T | 0 | — | N | — | O | — | P | — | | | | | | | | | | |
| 55T | 1 | | | | | | | | Q | — | R | — | S | — | T | — | U | — |
| 69T | 1 | V | — | W | — | X | — | Y | — | Z | CRC | EOF | | | | | | |

| FIFO_0 | FIFO_1 |
|---|---|
| SOF | |
| A | |
| B | |
| C | |
| D | |
| E | |
| F | |
| G | |
| H | |
| I | |
| J | |
| K | |
| L | |
| M | |
| N | |
| O | |
| P | |
| Q | |
| R | |
| S | |
| T | |
| U | |
| V | |
| W | |
| X | |
| Y | |
| Z | |
| CRC | |
| EOF | |

FIGURE 9

MULTI-RATE SHARED MEMORY ARCHITECTURE FOR FRAME STORAGE AND SWITCHING

BACKGROUND OF THE INVENTION

The present invention relates, in general, to the field of fibre channel switching technology. More particularly, the present invention relates to a route caching scheme for a receive port in a fibre channel switch.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

In a fibre channel switching environment, a shared memory within the switching element is used to store incoming frames bound for a particular exit port. A destination ID (D_ID) value in the frame header identifies the exit port associated with the incoming frame. For multiple data rates, rate matching FIFO's are used to store the frames before transmission out the receiving port.

In prior approaches, shared memory and storage structures required a large rate matching FIFO to support multiple data rates. For example, to buffer a frame that is incoming at twice the rate of the outgoing port, the FIFOs are at least one half the size of the maximum length frame. Since such FIFO's must necessarily be large to accommodate the number of ports that are coupled to shared memory, this approach requires a significant sized FIFO.

Existing architectures for buffer are also inefficient. For example, memory locations may be allocated to a particular frame, but never actually used. Buffers must handle both rate adaptive cases and same-speed cases, and if they use the same read/write method for both cases, memory is wasted. The current invention provides a different read/write methodology depending on the case.

SUMMARY OF THE INVENTION

A shared memory design in accordance with the present invention provides a solution to the aforementioned problem by providing a shared location for storing data frames prior to transmission to a receiving port in an efficient manner. The present invention can be implemented without requiring significant design changes and with only a relatively straightforward alteration to existing processes for networking in a fibre channel switching environment.

Particularly disclosed herein is a method for routing a data frame through a fibre channel fabric having a switch with a plurality of ports. The ports are operative for transmitting and receiving the data frame. A first port of the switch receives the data frame. The data frame is then written to a shared memory location. The shared memory location is coupled to at least two of the plurality of ports. A second port of the switch is identified. The second port is operative for transmitting the data frame from the shared memory location. A message is transmitted from the first port to the second port indicating the position in the shared memory location of the data frame. Finally, the data frame is read from the shared memory to the second port, wherein the switch has more than one rate for reading and writing data.

In another aspect, the present invention provides a shared memory location within a fibre channel fabric having a plurality of ports. The shared memory is coupled to the plurality of ports. The shared memory has a plurality of memory locations, each memory location having a column and also having a plurality of rows for storing a data frame. The shared memory also has a plurality of first-in, first out data storage locations, wherein a word is written from the memory location to the first-in first-out storage location before transmission to a port.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 5B illustrates several columns of memory and a read and a write operation for each column;

FIG. 6 illustrates a 2 gigibit per second write and a 2 gigibit per second read after a 2 gigibit per second write;

FIG. 7 illustrates a 2 gigibit per second write and a 1 gigibit per second read after a 2 gigibit per second write;

FIG. 8 illustrates a 1 gigibit per second write and a 2 gigibit per second read after a 1 gigibit per second write;

FIG. 9 illustrates a 1 gigibit per second write and a 2 gigibit per second read after a 1 gigibit per second write.

DESCRIPTION OF A PREFERRED EMBODIMENT

The present invention is illustrated and described in terms of a fibre channel fabric and particular fibre channel fabric elements (e.g., switches), however, the present invention is readily adapted to other protocols and environments. Particular examples herein specify data transmission rates and specific values and types of components to ease illustration and understanding. However, these specific examples are not limitations of the present invention unless explicitly indicted to the contrary.

Figure 1:
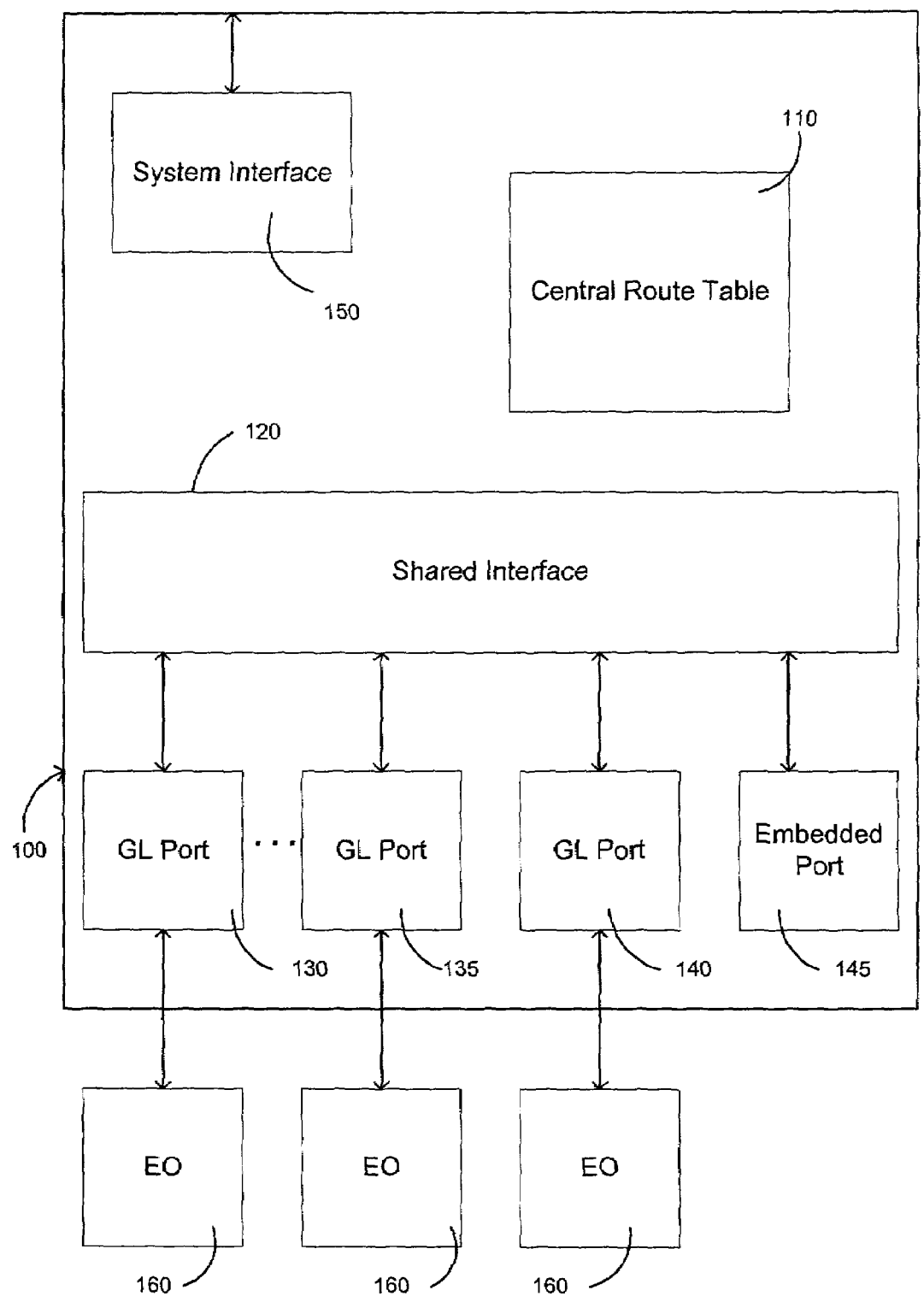
FIG. 1 is a block diagram of a switching element, wherein the switching element has a shared memory, a central route table and a plurality of fibre channel ports.

FIG. 1 shows a generalized block diagram of a fibre channel switch for use in a fibre channel fabric implementing the method and systems of the present invention. In one embodiment, the fibre channel switching element 100 of FIG. 1 may be implemented on a single application specific integrated circuit (ASIC). However, there are many implementations of switch 100 not shown, such as frame buffer memory could be located in each GL_Port in which case shared memory is replicated with a crossbar switch.

The fibre channel fabric associated with switch 100 is the method for connecting the various node ports (N-Ports) of the devices together. In this way, the fabric is capable of routing fibre channel frames using only the destination identification information in the fibre channel frame header. The destination identification information identifies which N-Port receives the frame.

Fibre channel switch 100 has a plurality of ports for receiving and transferring data through the switch. In FIG. 1, the ports are illustrated as GL-ports 130, 135 and 140. In one embodiment, switch 100 comprises 24 GL_Port modules. Each GL_Port is coupled to shared memory 120 and external optical interface 160. External optical interface couples switch 100 to the N-Port of the device coupled to the fibre channel fabric. Fibre channel switch 100 is associated with a central route table 110. Central route table 110 is operatively coupled to each GL-Port associated with fibre channel switch 100 (not shown in FIG. 1). Switch 100 also has a system interface 150. System interface module 150 provides interfaces to the power supply, fans, temperature sensor, LED's, and the serial interfaces of the optical transceivers.

Continuing, fibre channel switch 100 has an embedded port 145 in addition to illustrated GL_Ports 130, 135 and 140. Within the context of the invention, embedded port 145 may be used for several functions. First, it may provide a system services processor an access point for all of the fibre channel well-known addresses for both the reception and transmission of frames. Secondly, it may handle any fibre channel frame that cannot be delivered to a destination for either busy, reject, or timeout conditions. It may also be responsible for the generation, modification and/or interpretation of all Fibre Channel-Arbitrated Loop (FC-AL) initialization frames (such as LIFA, LIPA, LIHA, and LISA frames) for the GL-Ports operating in fabric loop mode. The embedded port interface is slightly different than that of an actual GL_Port module. Since the Fibre Channel-0/1 layers are not required, embedded port 145 does not implement the low-level interface for either primitive signaling or sequences. After the system services processor has completed initialization of embedded port 145, it enters and remains in the fibre channel active state.

Embedded port 145 provides a register set accessible to the system services processor for basic initialization and low-level control. Once enabled, embedded port 145 is responsible for all functions related to the transmission and reception of frames to and from shared memory 120. For data path consistency within the following description, the direction of fibre channel frame flow is referenced to shared memory 120. Thus, a transmit (TX) path actually contains paths destined to, or received by, the embedded port from shared memory 120 and a receive (RX) path contains frames generated or transmitted by embedded port 145.

Embedded port 145 creates and consumes buffers that contain complete fibre channel frames. Frames may be held in SRAM coupled to embedded port 145. SRAM will typically hold two frames, one TX frame received from shared memory 120 and one RX frame waiting to be moved into shared memory 120. All other TX frames waiting to be read by embedded port 145 and RX frames previously created by embedded port 145 are stored in shared memory buffers. In one embodiment, embedded port 145 may be allocated up to 12 shared memory buffers for storage of RX frames. Typically, TX frames utilize the shared memory buffers allocated to the GL-Ports that receive the fibre channel frames.

For example, for fast turn-around of Arbitrated Loop address initialization frames, a TX frame may be modified in place in the embedded port SRAM by software and sent via an RX path without the need to move the frame. One of the shared memory buffers allocated to an embedded port may be designated as a protected buffer. The protected buffer can be filled with an RX frame that is transmitted frequently and left intact so that the frame can be sent to an exit port without the time delay of moving the frame from the extended port SRAM to the shared memory buffer.

An embedded port receiver (RX) is used to transfer frames from a system services processor to other ports in the switch 100. The Receiver module will be substantially similar to the GL_Port RX module described hereinafter. Similarly, an embedded port transmitter (TX) is used to transfer frames from other ports via shared memory to a system services processor. The Transmitter module will be substantially similar to the GL_Port TX module also described hereinafter. An Embedded Port Front-end is used to transfer data between the Embedded Port SRAM and the TX and RX modules.

Shared memory 120 provides buffering and switching for all fibre channel frames that flow through switch 100. Received frames are written to shared memory 120 by the receiving port then read from shared memory 120 by the transmitting port. In one embodiment, shared memory 120 has 162 total frame locations shared by the GL-Ports 130, 135 and 140 and embedded port 145. In such an example, each port may be allocated as many as 12 buffers, so long as the total of 162 buffers is not exceeded.

Central Route Control module 110 provides a common route table for all ports in switch 100. Route table provides a translation from each possible Destination ID (D_ID) value to the appropriate exit port. Additionally, the route table provides for hard zoning, which is the capability for blocking traffic from certain receive ports to certain D_IDs. Each port uses an exit port request and response bus to communicate with central route table 110.

GL_Ports 130, 135 and 140 transmit and receive fibre channel frames to and from the switch and to and from the fibre channel fabric. As shown in FIG. 1, each GL_Port is coupled to an external optical interface 160 that in turn couples the port to the fabric and ultimately to the N_Port of the destination device.

GL_Ports may function as an E_Port, an F_Port or an FL_Port, for example. An E_Port is an expansion port that serves as a physical interface within the fabric that is used to create multi-switch fabrics by attaching another switches E_Port through an interswitch link (ISL). An F_Port is a fabric port that operates as a physical interface within the fabric that attaches to an N_Port of a destination device through a point-to-point link connection. An FL_Port is a fabric loop port that contains arbitrated loop (AL) functions associated with the FC-AL topology. FC-AL is a fibre channel topology where ports use arbitration to establish a point-to-point circuit.

Figure 2:
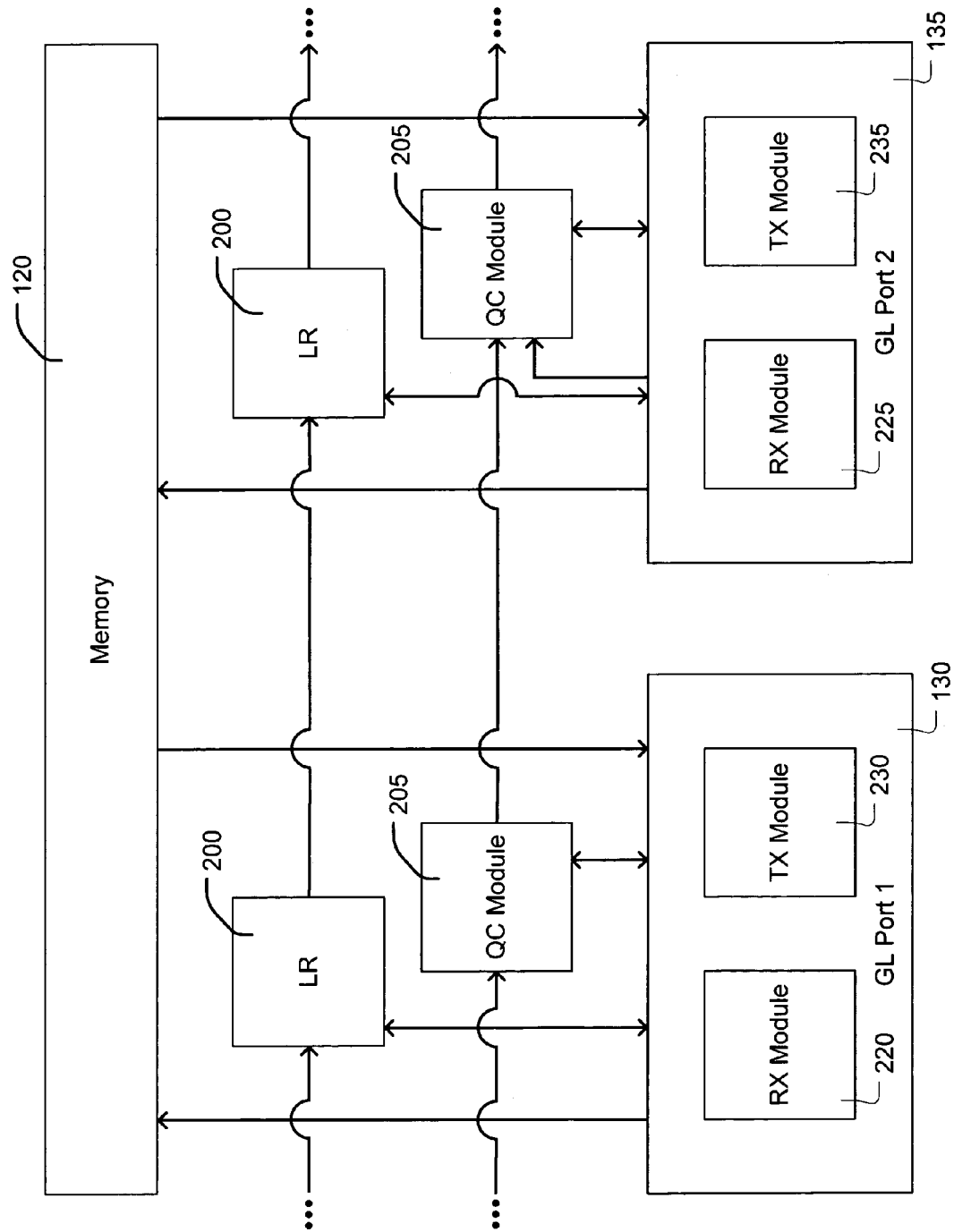
FIG. 2 is a detailed block diagram illustrating one embodiment of an interrelationship between modules of the switching element, particularly the fibre channel ports, local control route module, shared memory, and QC module.

FIG. 2 illustrates one possible method of connecting GL_Ports 130 and 135, as well as possible connections between the ports and shared memory 120 and local control route module 200. GL_Port 130 has a TX module 230 and an RX module 220 for sending and receiving frames. GL_Port 135 also has a TX module 235 and RX module 225. For example, if GL_Port 130 is the receiving port for a data frame and GL_Port 135 is the exit port for the data frame, the frame would first be sent from RX module 220 to shared memory 120 and then sent from shared memory 120 to TX module 235 as illustrated.

Continuing with the illustrated example of FIG. 2, RX port module of GL_Port 130 is coupled to TX port module of GL_Port 135 through a QC module 205. QC Control Module 205 acts as the control interface between the TX module 235 and RX module 220. QC Control Module 205 routes both a request and an acknowledgement signals between GL_Ports that serve to transmit exit port information and location of the fibre channel frame in shared memory from RX module 220 as well as return a successful frame transmission message from TX module 235.

Local route control module (LR) 200 is used by the GL_Port RX module to request the exit port for a frame based on the frame's destination ID value (D_ID). As shown in FIG. 2, a send and receive connection couples RX module 220 of GL_Port 130 with LR 200. The connection allows RX module 220 to request an exit port from the local control route module 200 and also for LR 200 to transmit the identity of the exit port back to RX module 220.

Figure 2A:
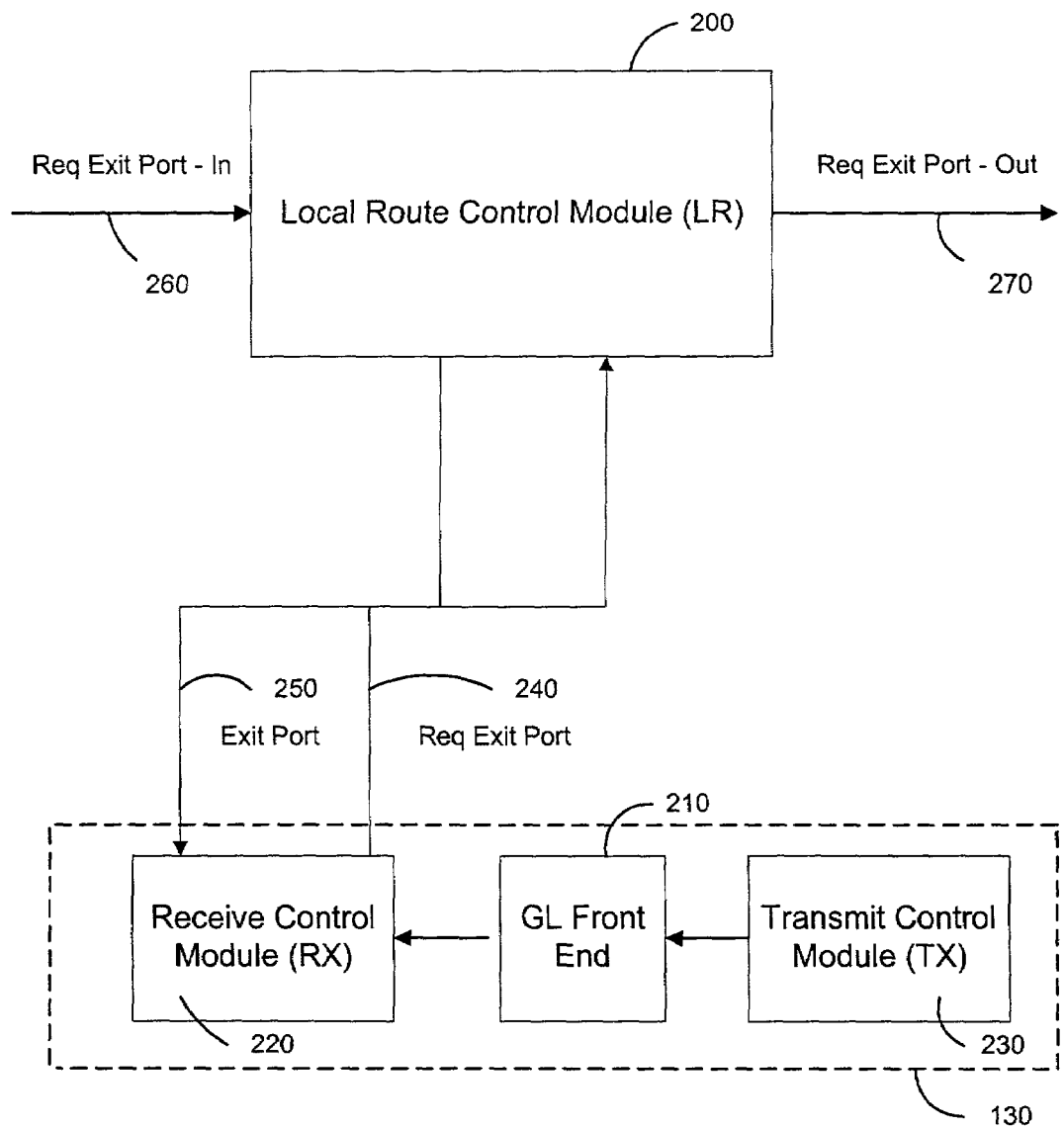
FIG. 2A is a block diagram illustrating a typical interface between a fibre channel port and a local route control module.

FIG. 2A illustrates the communication between GL_Port 130 and local route control module 200 in greater detail. TX control module 230 and RX control module 220 are coupled through fibre channel front-end module 210. Fibre channel front-end (FE) 210 provides the FC-0/1 level processing requirements. FE 210 includes all of the character level state machines required to support a fibre channel link, including all of the requirements for normal data frame processing. FE 210 provides an interface to the system services processor for low level control over the fibre channel link interface.

For the processing of frame traffic, FE 210 provides independent, symmetrical RX and TX interfaces to carry frame data. These paths consist of a data bus and control signals that identify the beginning and ending frame delimiters. For the RX path, status information about the frame including CRC validation, truncated frames and other pertinent status is also included as part of the signal.

Fibre channel front-end 210 continuously monitors its receive link for the detection of a start of frame (SOF) delimiter in the fibre channel frame. When a SOF is detected, FE 210 then forwards the frame to the RX module 220. RX module 220 stores the frame into the next available shared memory buffer. RX module 220 uses LR 200 to make a destination port routing decision from the header information of the received frame. RX module 220 then combines the shared memory buffer number into a field, which may be referred to as a Qentry field, which is passed to a TX module of the destination port through QC Module 205 RX module 220 then waits for the TX module to return the buffer number via an AckQEntry field. When RX module 220 receives the AckQEntry field it indicates to FE 210 that the buffer is being consumed.

The time that is required for all this processing is less than 1 microsecond, for example, in a particular fibre channel implementation. For this example it is most likely that RX module 220 is still storing the received frame while the TX module is transmitting the same frame, creating a cut-through switching effect. If the TX did not immediately transmit the frame, it is possible that the entire frame has been written into the buffer memory when transmission commenced, providing for a store and forward type of switching function.

The TX logic continuously monitors the bus coupling QC Controller 205 with TX module 230 for QEntries. When a QEntry is received, it is placed in TX module 230. When FE 210 is able to transmit a new frame, the queue selects a QEntry for processing. The shared memory buffer number for the frame to transmit is extracted from the QEntry and the TX module initiates a shared memory read operation. The frame data is then passed from the shared memory 120 to the FE 210. FE 210 transmits the frame.

Continuing with FIG. 2A, RX module 220 of port 130 is coupled to LR module 200 so as to request and receive exit port information. In one possible example, RX module 220 requests the identity of an exit port for a particular frame by sending a request over ReqExitPort connection 240 to LR 200. LR module 200 performs the necessary procedure for retrieving the exit port identity based on the transmitted D_ID. LR module 200 then transmits the generated exit port information to RX module 220 over ExitPort connection 250.

Figure 3:
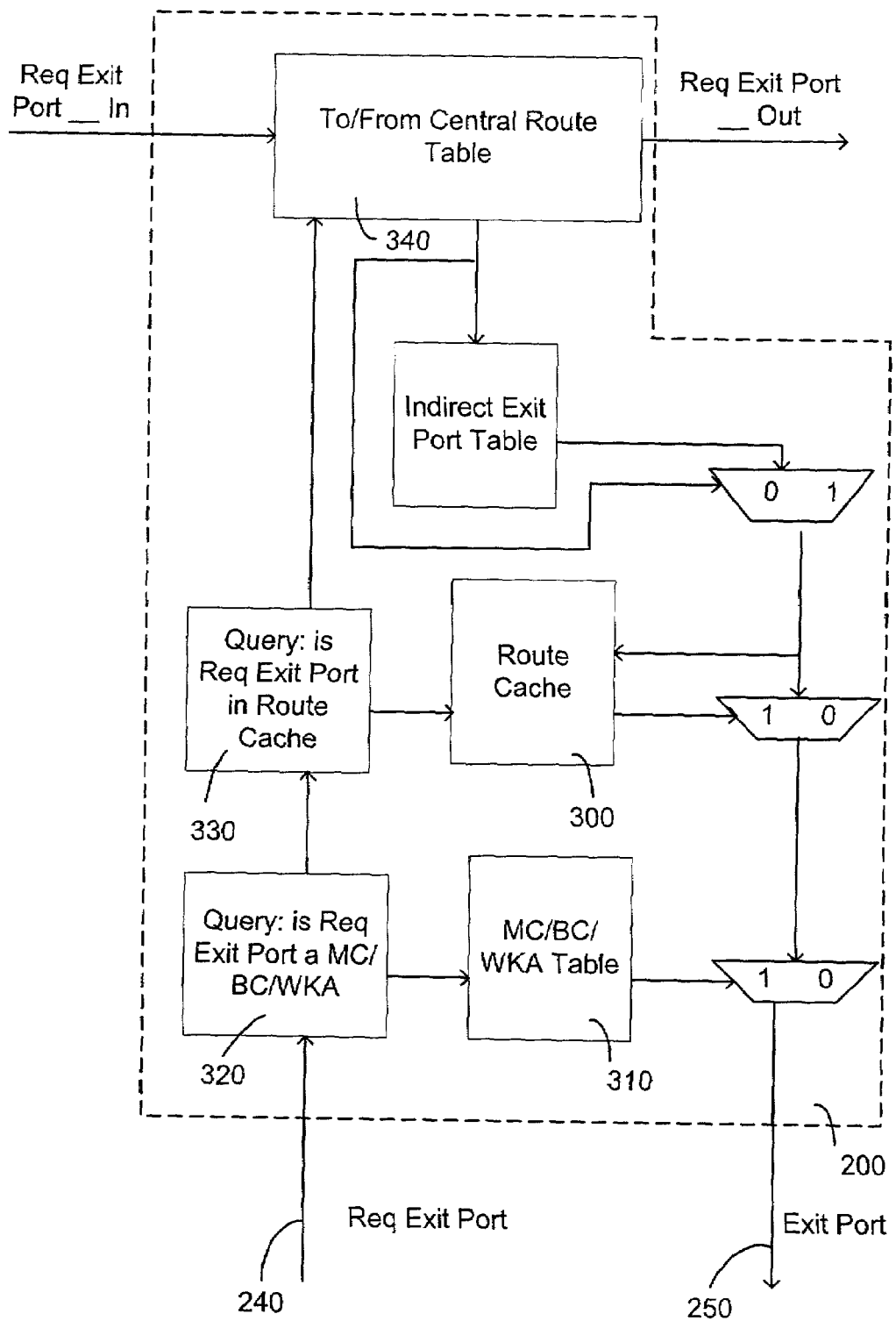
FIG. 3 is a detailed block diagram of a local route control module.
Figure 4:
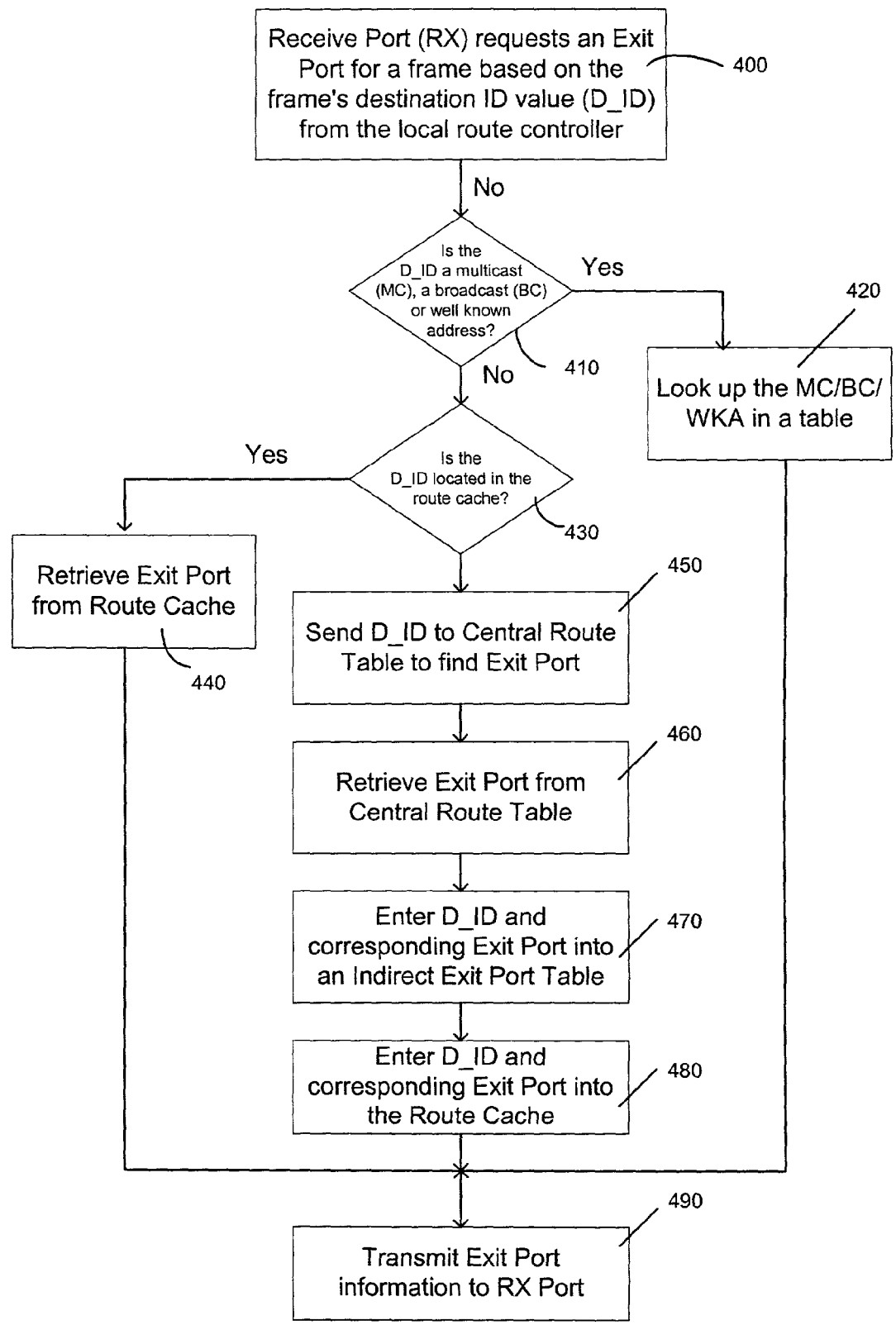
FIG. 4 is a flow chart for a data cache operation.
Figure 4A:
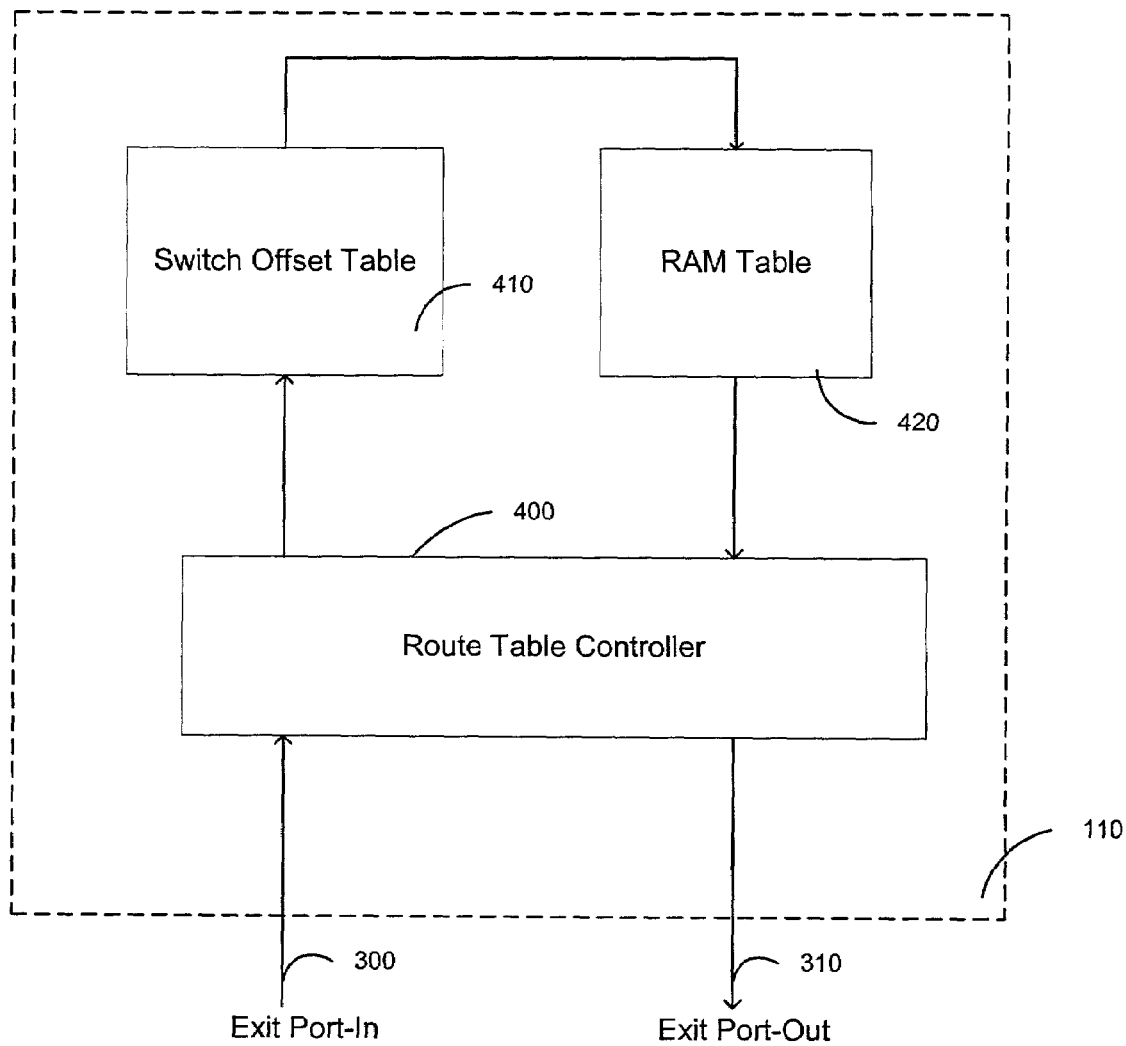
FIG. 4A is a block diagram of an exemplary central route table module.
Figure 4B:
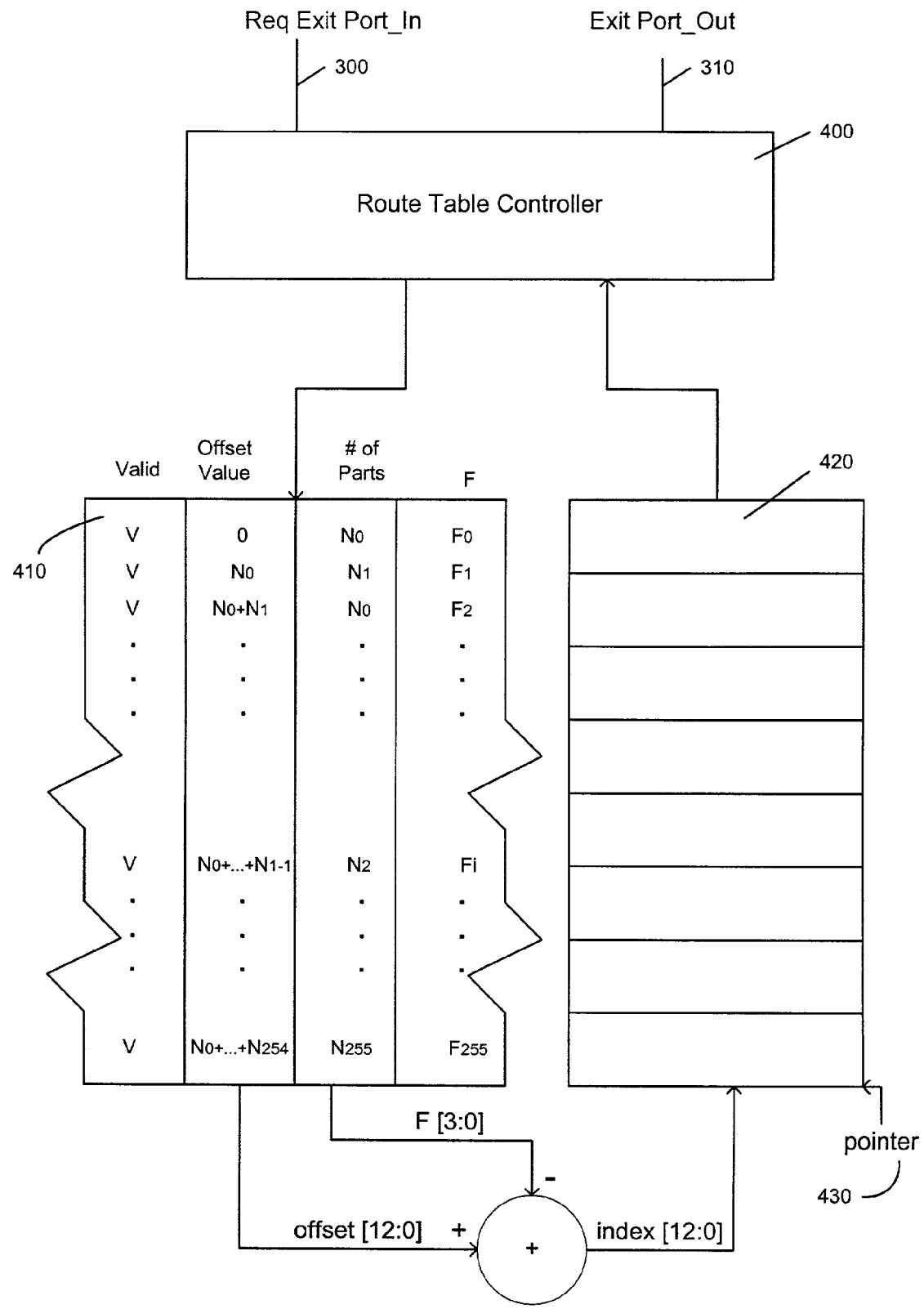
FIG. 4B is a more detailed block diagram of an exemplary central route table module.

FIGS. 3 and 4 illustrate the operation of local route control module 200 in greater detail. Local route control module 200 is used by GL_Port RX module 220 to request an exit port for a fibre channel frame based on the frame's D_ID value. In the illustrated example, the request for an exit port comes in on the ReqExitPort bus 240 to local route control 200.

RX module requests an exit port by providing a D_ID from the frame header to local route control module 200 (step 400). In one embodiment, the D_ID has 24 bits, starting with the 0 bit, which is represented by a designation [23:0]. The first operation 320 of local route control module 200 is to determine if the D_ID identifies a multicast (MC), a broadcast (BC) or a well-known address (WKA) (step 410). Multicast and broadcast addresses are directed to a MC/BC/WKA table 310 to identify the exit port. Well-Known Addresses and FC-AL Loop Initialization addresses always result in the Embedded Port being selected as the Exit Port. Domain controller identifier addresses are sent to the central route table for exit port lookup unless a bit is set and the frame is not a class F frame, in which case the Embedded port is selected as the exit port.

If central route table 110 has not yet been initialized, then all frames are routed to the embedded port. All other D_ID values are forwarded to central route table 110. However, prior to forwarding a request for an exit port to central route table 110, LR 200 performs an operation 330 to determine whether an association between the requested D_ID and an exit port designation is found in route cache 300 (step 430). If the D_ID to exit port association is found in route cache 300, the exit port is available immediately. Route cache 300 improves latency by caching the most recent exit port lookups. In one embodiment, the sixteen most recent lookups are stored in cache 300. Cache 300 should be cleared when either the central route table 110 or indirect exit tort table 350 is modified.

If the D_ID is not located in route cache 300, then local route controller 200 performs an operation 340 to send the D_ID to a central route table 110. Central route table 110 retrieves the D_ID to exit port association and returns it to local route controller 200. If applicable, the D_ID to exit port association is stored in an indirect exit port table 350 (step 470). As shown in step 480, D_ID to exit port association is stored in route cache 300. In the illustrated example, D_ID to exit port association is sent to RX module over ExitPort bus 250 (step 490).

Shared memory 120 provides buffering and switching for all frames that flow through the switch 100. Received frames are written to shared memory 120 by the receiving port then read from shared memory 120 by the transmitting port. In one embodiment, shared memory 120 has 136 total buffers shared by the 16 GL_ports and the Embedded Port. For this example, each port may be allocated as many as 12 buffers, so long as the total of 136 buffers is not exceeded.

Figure 5A:
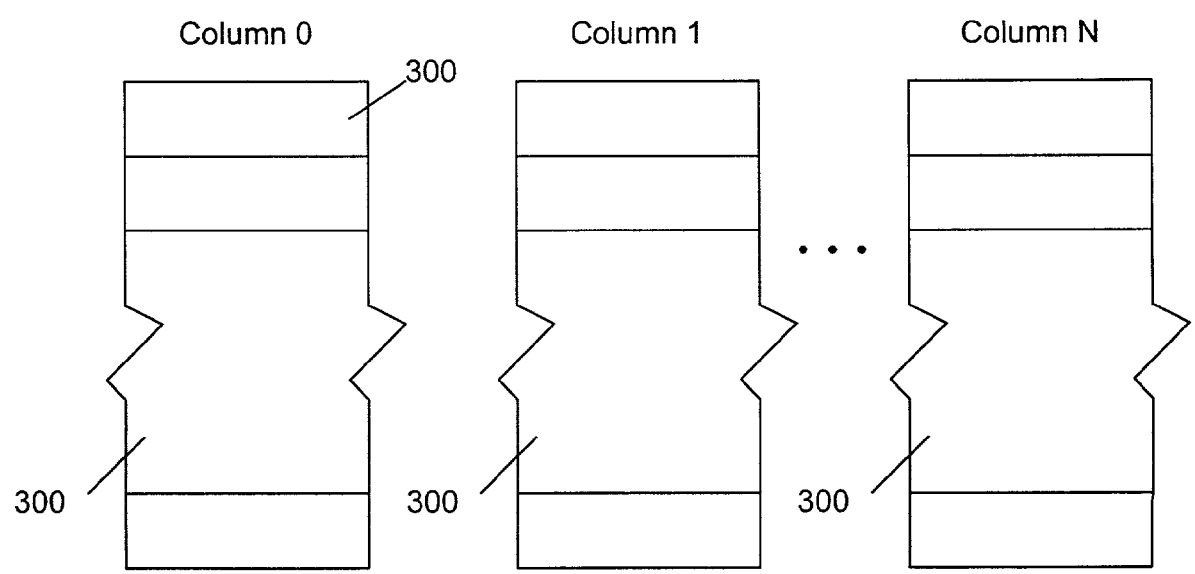
FIG. 5A is a block diagram of several columns of memory.

Shared memory 120 is basically a data frame buffer that is spread out over several columns of memory. As shown in FIG. 5A, in one embodiment, shared memory 120 is implemented as N SRAM modules. Each SRAM module comprises a column 300, where N is greater than or equal to the number of ports that share the memory. In a preferred embodiment, N is odd. At each cycle, each port has access to one of the rows 310 in one of the columns 300. At the subsequent cycle, each port has access to the next row 310 in a subsequent column 300. This allows each port to have access to each column 300 every N cycles.

FIG. 5B illustrates the example where N=17. In this example, shared memory must support 17 ports at $2 \times 2.125^8$ bytes/second or $34 \times 1$ byte accesses/$T_{212}$. $34 \times 1$ byte accesses/$T_{212}$ is equivalent to $17 \times 4$ byte accesses/$T_{106}$. As such, a 2148 byte frame will consume 32 rows according to the following calculation:

# of rows=2148 bytes/(17 columns*4 words/byte)

Since the number of rows a frame consumes is essentially the size of the buffer, the more general equation to determine the number of rows per buffer is as follows:

# of rows/buffer=#bytes/buffer #bytes/row

The number of bytes per row is determined by multiplying the number of columns by the number of bytes per word.

FIG. 5B illustrates how ports are assigned access to Columns. In the figure, Wn refers to a write cycle assigned to Port n, and Rn refers to a read cycle assigned to Port n. For the embedded port, n=16. Continuing, FIG. 5B specifically illustrates 17 columns and the read or write operation for each time modulo 34. In the illustrated example, at time modulo 0, the ports are able to perform a write operation to a column of memory. As shown, port_0 performs a write operation to the first column of memory, column 0. At time modulo 1, the ports can perform a read operation from a column of memory. As shown, port_0 performs a read operation from the first column of memory, column 0. It should be understood that although the example shows port_0 writing and reading from column 0 at time modulo 0, any column could have been used as a starting point without departing from the intended scope of the invention.

The first word of the frame should be written to the first available column. For example, if GL Port_7 has completed read and write cycles to Column 15, it will then get access to Column 16. After accessing Column 16, the port will next have access to Column 0, then Column 1, etc.

Continuing with the example for port_0, in the given example for N=17, the next 16 words will be written into the same row but the next column. FIG. 5B illustrates such an operation. At time modulo 2, port_0 performs a write operation in column 1, but in the same row as the write operation performed at time modulo 0. In this way, no columns in the first row are unused and no additional memory is necessary for each frame. Continuing with the example, at time modulo 3, port_0 performs a read operation from column 1. The remainder of the example illustrated in FIG. 5B tracks the operation of performing a write to a column of memory, performing a read operation on the same column and then moving to the next column.

As stated previously, to support 17 simultaneous 4-byte accesses every 106 MHz clock period, shared memory 120 is constructed from 17 separate SRAM modules or columns. Each buffer is striped across all 17 columns and requires 32 rows per buffer, where a row consists of 1 word at the same offset in each of the 17 columns. Continuing with the example of N=17, the total memory requirement for 136 frame buffers is:

8 frames/port*17 ports*32 rows/frame=4352 rows

However, memory depth is typically provided in multiples of 512 so there are actually 4608 rows.

In one embodiment, shared memory 120 supports both 1 Gbps and 2 Gbps read and write data rates. In one important aspect of the invention, shared memory 120 allows data to be written to a buffer at one rate and read from the same buffer at another rate, in this case 1 Gbps and 2 Gbps. One skilled in the art should understand that other data rates may be used without departing from the intended scope of the invention.

FIG. 6 illustrates the example of a 2 Gbps write and a 2 Gbps read operation after a 2 Gbps write operation. In this example, the read and write data rates are identical. The write operation will be explained first. As shown, at time 0 (0T), the start of frame (SOF) word is written to column 7, row 0. The SOF delineates the beginning of the data from the frame. At time 2T (as will be explained hereinafter, a read operation is performed at time 1T), the first word A of the frame is written into column 8, also in row 0. At each successive write time, in this case each time nT where n is an even number, the next word is written into the subsequent column, but in the same row.

Continuing with the write example of FIG. 6, at time 34T, no additional space is available in row 0, column 7 for another word since the SOF was written in this location at time 0T. Therefore, the shared memory moves down a row and writes the next word Q in row 1, column 7. As illustrated, the write operation continues in row 1 at each subsequent column until the end of frame (EOF) delineator is received.

Continuing with the example illustrated in FIG. 6, a 2 Gbps read operation after a 2 Gbps write operation is shown. FIG. 6 also shows the two FIFO registers, FIFO_0 and FIFO_1 for storing words during a read operation. Since the data rates are identical for the read and write operation, the data will move alternately into FIFO_0 and FIFO_1 and then move alternately out of FIFO_0 and FIFO_1. According to the example, at time 1T, the SOF delineator is read from column 7, row 0 into FIFO_0. At time 3T, word A is read from column 8, row 0 into FIFO_1. Continuing, at time 5T, word B is read from column 9, row 0 into FIFO_0. This "ping-pong" operation continues until the EOF delineator is read into FIFO_0. Meanwhile, since a read from a FIFO is done concurrently with a write to a FIFO, data is read alternately from FIFO_0 and FIFO_1 to the receiving port at a 2 Gbps rate.

FIG. 7 illustrates the example of a 2 Gbps write and a 1 Gbps read operation after a 2 Gbps write operation. In this example, the read and write data rates are different. The write operation will be explained first. As shown, at time 0 (0T), the start of frame (SOF) word is written to column 7, row 0. As explained previously, the SOF delineates the beginning of the data from the frame. At time 2T, the first word A of the frame is written into column 8, also in row 0. At each successive write time, in this case each even time nT where n is an even number, the next word is written into the subsequent column, but in the same row.

Continuing with the write example of FIG. 7, at time 34T, no additional space is available in row 0, column 7 for an another word since the SOF was written in this location at time 0T. Therefore, the shared memory moves down a row and writes the next word Q into row 1, column 7. As illustrated, the write operation continues in row 1 at each subsequent column until the end of frame (EOF) delineator is received.

Continuing with the example illustrated in FIG. 7, a 1 Gbps read operation after a 2 Gbps write operation is shown. FIG. 7 also shows the two FIFO registers, FIFO_0 and FIFO_1, for storing words during a read operation. Since the data rates are not identical for the read and write operation in FIG. 7, the data will move alternately into FIFO_0 and FIFO_1, pausing for 17 cycles after every 17 cycles to match rates. Meanwhile, the data is moved alternately out of FIFO_0 and FIFO_1 at a 1 Gbps rate.

According to the example of FIG. 7, at time 1T, the SOF delineator is read from column 7, row 0 into FIFO_0. At time 3T, word A is read from column 8, row 0 into FIFO_1. Continuing, at time 5T, word B is read from column 9, row 0 into FIFO_0. This "ping-pong" operation continues until word P is read into FIFO_0. At this point, the operation pauses from 35T to 67T for purposes of matching the rates. The read operation then continues at 69T thereby reading word Q into FIFO_1. This "ping-pong" operation continues until the EOF delineator is read into FIFO_0. Data is read alternately from FIFO_0 and FIFO_1 to the receiving port at a 1 Gbps rate.

FIG. 8 illustrates the example of a 1 Gbps write and a 2 Gbps read operation after a 1 Gbps write operation. In this example, the read and write data rates are different. The 1 Gbps write operation will be explained first. As shown, at time 0 (0T), the start of frame (SOF) word is written to column 7, row 0. As explained previously, the SOF delineates the beginning of the data from the frame. At time 2T, the first word A of the frame is written into column 9, also in row 0. For the time being, row 0, column 8 is skipped. At each successive write time, in this case each even time nT where n is an even number, the next word is written into the second subsequent column, but in the same row. As shown in the example, at time 28T, word I is written into the previously skipped column 8, row 0.

Continuing with the write example of FIG. 8, at time 68T, no additional space is available in row 0, column 7 for an another word since the SOF was written in this location at time 0T. Therefore, the shared memory moves down a row and writes the next word Q into row 1, column 7. As illustrated, the write operation continues in row 1 at every other subsequent column until the end of frame (EOF) delineator is received.

Continuing with the example illustrated in FIG. 8, a 2 Gbps read operation after a 1 Gbps write operation is shown. FIG. 8 shows the two FIFO registers, FIFO_0 and FIFO_1, for storing words during a read operation. Since the data rates are not identical for the read and write operation in FIG. 8, the data will move alternately into FIFO_0 and FIFO_1, and then move alternately out of FIFO_0 and FIFO_1 in a manner such that the words are read out in a proper order.

According to the example of FIG. 8, at time 1T, the SOF delineator is read from column 7, row 0 into FIFO_0. At time 3T, word A is read from column 8, row 0 into FIFO_1. Continuing, at time 5T, word B is read from column 9, row 0 into FIFO_0. This "ping-pong" operation continues until word T is read into FIFO_1. At this point, there is no word to read into FIFO_0. The read operation skips FIFO_0 but the read operation then continues at 51T thereby reading word U into FIFO_1. This "ping-pong" operation continues until the EOF delineator is read into FIFO_0.

Data is read alternately from FIFO_0 and FIFO_1 to the receiving port in a manner so as to ensure the order and therefore integrity of the frame. In the illustrated example, the first nine words are read out of FIFO_0. The number of words is determined by the equation $(N+1)/2$ where N is equal to the number of ports. Once the first nine words are read from FIFO_0, the first seventeen words are read from FIFO_1. The number of words read from FIFO_1 is equal to the number of ports N. Then, the remaining words are read from FIFO_0, however, if there were more than N words only the first N words would be written from FIFO_0. The sequence $(N+1)/2, N_1, N_2 \ldots N_x$ represents this procedure of reading words from FIFO_0 and FIFO_1, wherein N represents the number of ports and x represents the number of read operations to completely empty FIFO_0 and FIFO_1.

FIG. 9 illustrates the example of a 1 Gbps write and a 1 Gbps read operation after a 1 Gbps write operation. In this example, the read and write data rates are identical. The 1 Gbps write operation will be explained first. As shown, at time 0 (0T), the start of frame (SOF) word is written to column 7, row 0. At time 2T, the first word A of the frame is written into column 9, also in row 0. In the interim, row 0, column 8 is skipped. At each successive write time, in this case each even time nT where n is an even number, the next word is written into the second subsequent column, but in the same row. As shown in the example, at time 28T, word I is written into the previously skipped column 8, row 0.

Continuing with the write example of FIG. 9, at time 68T, no additional space is available in row 0, column 7 for an another word since the SOF delineator was written in this location at time 0T. Therefore, the shared memory moves down a row and writes the next word Q into row 1, column 7. As illustrated, the write operation continues in row 1 at the second subsequent column until the end of frame (EOF) delineator is received.

Continuing with the example illustrated in FIG. 9, a 1 Gbps read operation after a 1 Gbps write operation is shown. FIG. 8 shows the two FIFO registers, FIFO_0 and FIFO_1, for storing words during a read operation. Since the data rates are identical for the read and write operation in FIG. 9, the data will be written into FIFO_0, thereby skipping FIFO_1, and then move out of FIFO_0 at a 1 Gbps rate.

According to the example of FIG. 9, at time 1T, the SOF delineator is read from column 7, row 0 into FIFO_0. At time 3T, word A is read from column 9, row 0 into FIFO_0. Continuing, at time 5T, word B is read from column 11, row 0 into FIFO_0. Nothing is written into FIFO_1. This operation continues until the EOF delineator is read into FIFO_0. The words are then read out of FIFO_0 at a 1 Gbps rate to the receiving port.

Figure 10:
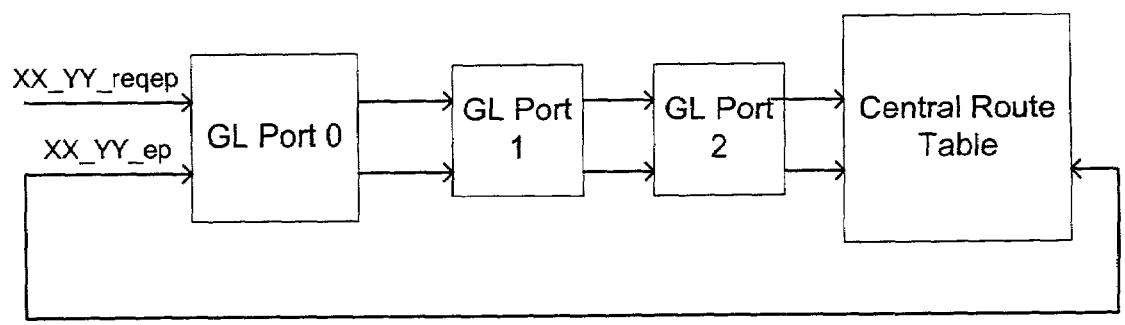
FIG. 10 is a block diagram of the request exit port bus and the exit port response bus.

FIG. 10 illustrates the structure of a request exit port bus ring structure. The request exit port bus is used by the receive controller of a GL_Port to request an exit port number for a given D_ID from the central route controller. The request exit port bus is designed to operate in a ring structure in which each module that is attached to the request exit port bus pipelines and re-powers the request exit port bus signals before sending them to the next module in the ring. The local route control module is used to provide the attachment to the request exit port bus for each module. The request exit port bus signals are described in Table 1.

TABLE 1

Request Exit Port Bus Signal Descriptors

| Signal | Bits | Description |
| --- | --- | --- |
| xx_yy_reqep_v | 1 | Valid bit. Set to '1' for 1 period when xx_yy_reqep_* signals are valid. A module may insert its request for an exit port on the bus when it detects that this bit is '0', indicating an empty time slot. |
| xx_yy_reqep_rxport | 5 | Receive Port Number. Indicates which receiver port is requesting an exit port. |
| xx_yy_reqep_d_id | 24 | Frame destination ID field (D_ID). |
| xx_yy_reqep_bid | 2 | Buffer Identifier. Used to guarantee in-order delivery of exit port information. |
| xx_yy_reqep_p | 1 | Odd Parity. A parity error is reported as a rare event and the request is disgarded. |

FIG. 10 also illustrates the exit port response bus ring. The exit port response bus is used by the central route controller to return an exit port number to an RX module of a GL_Port. The exit port response bus is designed to operate in a ring structure in which each module that is attached to the exit port response bus pipelines and re-powers the exit port response bus signals before sending them to the next module in the ring.

The central route controller may insert an exit port response on the bus in any clock cycle. A local route control module will extract the exit port response from the bus if it is addressed to that GL_Port. The local route control module is used to provide the attachment to the exit port response bus for each module. The exit port response bus signals are described in Table 2.

TABLE 2

Exit Port Response Bus Signal Descriptors

| Signal | Bits | Description |
| --- | --- | --- |
| xx_yy_ep_v | 1 | Valid bit. Set to '1' for 1 period when all xx_yy_ep_* signals are valid. Always set to '1' by the central route control module. Cleared to '0' by the GL_Port, addressed by xx_yy_ep_rxport, that receives the exit port information. |
| xx_yy_ep_err | 2 | Error Status. 00: OK, 01: Parity Err, 10: Bad D_ID, 11: Zone Blocked. |
| xx_yy_ep_rxport | 5 | Receive Port Number. Indicates which receive port that the exit port information is destined for. |

TABLE 2-continued

Exit Port Response Bus Signal Descriptors

| Signal | Bits | Description |
| --- | --- | --- |
| xx_yy_ep_indirect | 1 | Indirect Lookup Required Bit. When set to '1' the Indirect Lookup Table, addressed by xx_yy_ep_txport [3:0], must be used for determining the exit port. |
| xx_yy_ep_txport | 5 | Transmit Port. Identifies the exit port to which a frame must be sent. xx_yy_ep_txport [3:0] addressed the Indirect Lookup Table when the indirect bit is set to '1'. |
| xx_yy_ep_bid | 2 | Buffer Identifier. Used to guarantee in-order delivery of exit port information. |
| xx_yy_ep_p | 1 | Odd Parity. A parity error is reported as a rare event and the exit port information is disgarded. |

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for routing a data frame through a fibre channel fabric, said fibre channel fabric comprising a switch having a plurality of ports, said ports are operative for transmitting and receiving said data frame, said method comprising:

receiving said data frame at a first port of said switch;

writing said data frame to a shared memory location, said shared memory location is coupled to at least two of said plurality of ports of said fibre channel switch;

identifying a second port of said switch, said second port operative for transmitting said data frame from said shared memory location;

transmitting a message from said first port to said second port indicating the position in said shared memory location of said data frame; and at said second port, reading said data frame from said memory, wherein said switch has more than one rate for reading and writing data.

2. The method of claim 1, wherein said shared memory location is implemented using a plurality of SRAM modules, one or more SRAM module for each of said plurality of fibre channel ports.

3. The method of claim 2, wherein said plurality of fibre channel ports is an odd number of fibre channel ports.

4. The method of claim 1, wherein said shared memory comprises a plurality of columns and wherein each of said plurality of fibre channel ports has access to one of said plurality of columns.

5. The method of claim 4, wherein said access occurs during a clock cycle.

6. The method of claim 4, wherein said access occurs during a 106.25 MHz clock cycle.

7. The method of claim 4, wherein said plurality of columns comprises a plurality of SRAM modules.

8. The method of claim 4, wherein said plurality of fibre channel ports have a read access during a first clock cycle and a write access during a second clock cycle, said second clock cycle immediately follows said first clock cycle.

9. The method of claim 1, wherein said shared memory location supports both a 1 gigabit per second and a 2 gigabit per second read and write data rate.

10. A method for providing a shared memory location in a fibre channel fabric, said fibre channel fabric comprising a fibre channel switch having a plurality of fibre channel ports, said fibre channel ports are operative for transmitting and receiving a data frame, said method comprising:

receiving said data frame at a first fibre channel port of said fibre channel switch;

writing said data frame in said shared memory location, said shared memory location coupled to each of said plurality of fibre channel ports;

reading said data frame from said shared memory location into a second fibre channel port, wherein said fibre channel switch has more than one rate for reading and writing data; and transmitting said data frame to the second fibre channel port, wherein said writing and reading are performed in a manner that is dependent on the relative rates at which said frame is received and transmitted.

11. The method of claim 10, wherein said shared memory location is implemented using a plurality of SRAM modules, one or more SRAM modules for each of said plurality of fibre channel ports.

12. The method of claim 11, wherein said plurality of fibre channel ports comprises an odd number of fibre channel ports.

13. The method of claim 10, wherein said shared memory location comprises a plurality of columns and wherein each of said plurality of fibre channel ports has access to one of said plurality of columns.

14. The method of claim 13, wherein said access occurs during a clock cycle.

15. The method of claim 13, wherein said access occurs during a 106.25 MHz clock cycle.

16. The method of claim 13, wherein said plurality of columns comprises a plurality of SRAM modules.

17. The method of claim 13, wherein said plurality of fibre channel ports have a read access during a first clock cycle and a write access during a second clock cycle, said second clock cycle immediately follows said first clock cycle.

18. The method of claim 10, wherein said shared memory location supports both a 1 gigabit per second read and write data rate and a 2 gigabit per second read and write data rate.

* * * * *